US010207814B2

United States Patent
Marks

(10) Patent No.: US 10,207,814 B2
(45) Date of Patent: Feb. 19, 2019

(54) RAM AIR TURBINE COOLING INLET SCREEN HEATING SYSTEM

(71) Applicant: Hamilton Sundstrand Corporation, Charlotte, NC (US)

(72) Inventor: Scott J. Marks, Oregon, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 208 days.

(21) Appl. No.: 15/223,426

(22) Filed: Jul. 29, 2016

(65) Prior Publication Data

US 2018/0029722 A1    Feb. 1, 2018

(51) Int. Cl.
| | | |
|---|---|---|
| B64D 41/00 | (2006.01) |
| F01D 5/02 | (2006.01) |
| F01D 15/10 | (2006.01) |
| F02C 7/047 | (2006.01) |
| F02C 7/055 | (2006.01) |

(52) U.S. Cl.
CPC .............. B64D 41/007 (2013.01); F01D 5/02 (2013.01); F01D 15/10 (2013.01); F02C 7/047 (2013.01); F02C 7/055 (2013.01); F05D 2220/34 (2013.01)

(58) Field of Classification Search
CPC ........ B64D 41/007; F01D 15/10; F02C 7/047
See application file for complete search history.

(56) References Cited

U.S. PATENT DOCUMENTS

| | | | | |
|---|---|---|---|---|
| 5,484,120 | A * | 1/1996 | Blakeley | B64D 41/007 244/54 |
| 6,127,758 | A * | 10/2000 | Murry | B64D 41/007 244/53 R |
| 8,844,258 | B2 * | 9/2014 | Ekanayake | F02C 7/047 60/39.093 |
| 9,067,679 | B2 | 6/2015 | Scimone | |
| 2002/0154999 | A1 * | 10/2002 | Eccles | B64D 41/007 416/95 |
| 2010/0101206 | A1 * | 4/2010 | Haehner | F02C 7/047 60/39.093 |
| 2011/0095531 | A1 * | 4/2011 | Menges | F03D 3/005 290/44 |
| 2011/0236218 | A1 * | 9/2011 | Russ | B64D 41/007 416/246 |
| 2014/0077039 | A1 * | 3/2014 | Scimone | B64D 15/12 244/23 B |
| 2016/0122034 | A1 * | 5/2016 | Bortoli | B64D 41/007 416/142 |
| 2016/0353523 | A1 * | 12/2016 | Jarvinen | F01D 5/08 |
| 2017/0194545 | A1 * | 7/2017 | de Rochemont | H01L 35/04 |
| 2017/0292448 | A1 * | 10/2017 | Dornier | F02C 7/055 |
| 2017/0349294 | A1 * | 12/2017 | Bortoli | B64D 41/007 |

* cited by examiner

Primary Examiner — Philip J Bonzell
Assistant Examiner — Tye William Abell
(74) Attorney, Agent, or Firm — Cantor Colburn LLP

(57) ABSTRACT

A heating system for a ram air turbine includes a heated screen that is disposed across an air inlet defined by a strut. The strut has a first end that is connected to a generator that is operably connected to a turbine that is connected to a second end of the strut. The heated screen has a heating element embedded therein.

11 Claims, 2 Drawing Sheets

RAM AIR TURBINE COOLING INLET SCREEN HEATING SYSTEM

BACKGROUND

Aircraft are provided with a ram air turbine system that is configured to provide electrical or hydraulic power to the aircraft in certain situations. The ram air turbine system is stowed within the aircraft and is selectively deployed into an air stream. The ram air turbine system may receive cooling air to cool the electrical equipment of the ram air turbine system. The cooling air inlet is provided with an inlet screen to prevent foreign objects from entering the generator.

BRIEF DESCRIPTION

According to an embodiment of the present disclosure, a ram air turbine system is provided. The ram air turbine system includes a strut, a heated screen, a turbine, and generator. The strut is pivotally connected to a mounting frame that is operatively connected to an aircraft structure. The strut is defined by a strut body that extends between a first end and a second end. The strut body defines an air inlet. The heated screen has a heating element that is embedded within the heated screen. The turbine is disposed at the second end of the strut. The generator is disposed proximate the first end of the strut. The generator is drivably connected to the turbine via a drive shaft.

According to another embodiment of the present disclosure, a ram air turbine system is provided. The ram air turbine system includes a strut and a heating system. The strut has a first end that is connected to a generator that is drivably connected to a turbine that is connected to a second end. The strut is provided with an air inlet that is disposed proximate the first end. The heating system is electrically connected to the generator. The heating system has a heated screen that is disposed over the air inlet.

According to yet another embodiment of the present disclosure, a heating system for a ram air turbine is provided. The heating system includes a heated screen that is disposed across an air inlet defined by a strut. The strut has a first end that is connected to a generator that is operably connected to a turbine that is connected to a second end of the strut. The heated screen has a heating element embedded therein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
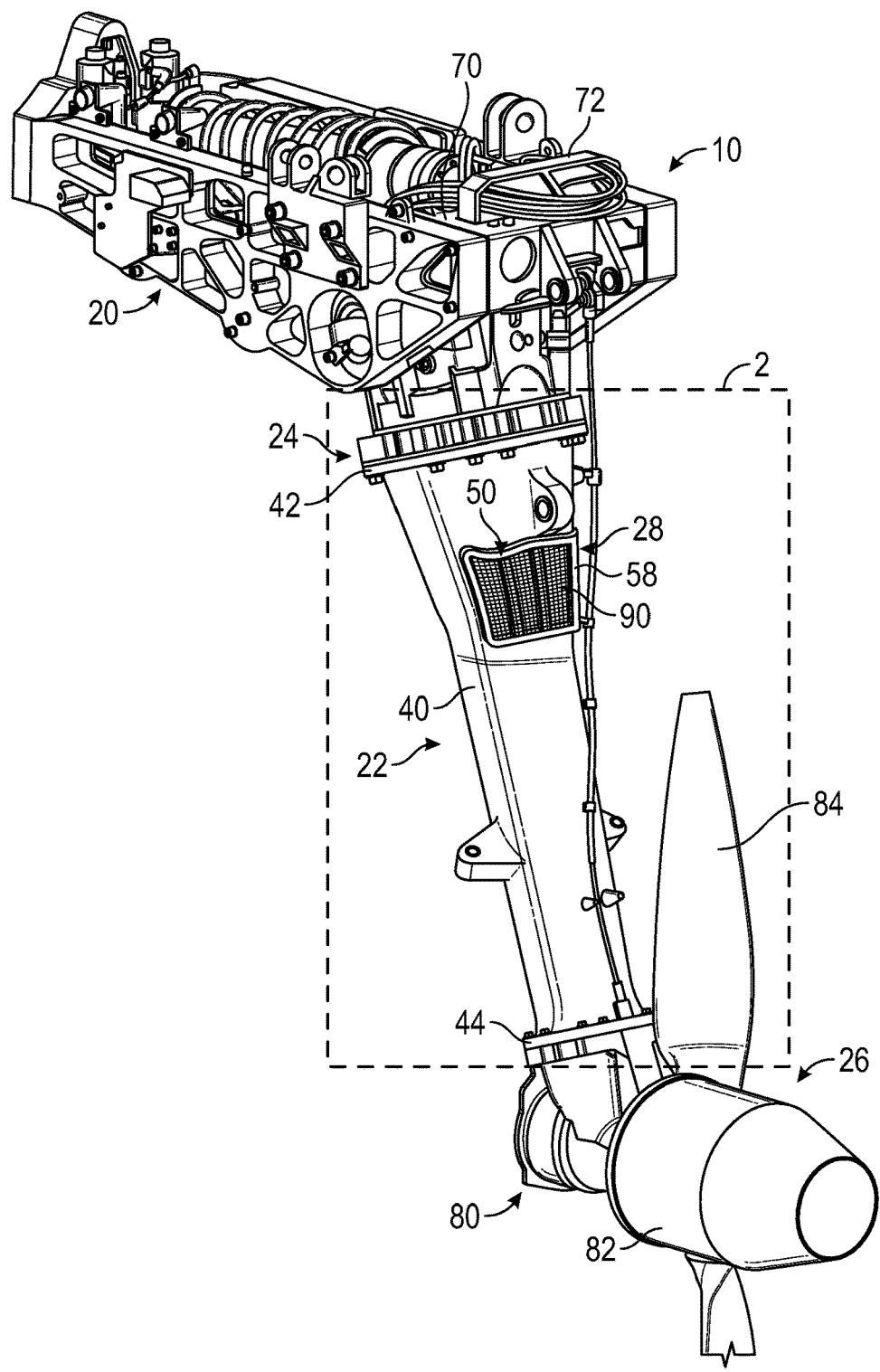
FIG. 1 is a perspective view of a ram air turbine system having a heating system in a deployed position.

Referring to FIG. 1, a ram air turbine system 10 is shown. The ram air turbine system 10 is secured to an aircraft structure. The ram air turbine system 10 may be movably or pivotally disposed within the aircraft fuselage, a wing to body fairing, a portion of the aircraft nose cone, or other positions. The ram air turbine system 10 is movable between a stowed position and a deployed position.

The ram air turbine system 10 includes a mounting frame 20, a strut 22, a generator 24, a turbine 26, and a heating system 28. The mounting frame 20 is operatively connected to the aircraft structure. The mounting frame 20 is operatively connected to an actuator arranged to move the strut 22 between the stowed position and the deployed position.

The strut 22 is connected to the generator 24 which is pivotally connected to the mounting frame 20 or directly connected to the aircraft structure. The strut 22 includes a strut body 40 that extends between a first end 42 and a second end 44. The strut body 40 is configured as a hollow body that extends along an axis. The strut body 40 defines an air inlet 50. The air inlet 50 is disposed between the first end 42 and the second end 44 of the strut 22. The air inlet 50 is disposed closer to the first end 42 than the second end 44 of the strut 22.

The air inlet 50 extends from an exterior surface of the strut body 40 through an interior surface of the strut body 40. The air inlet 50 includes a single inlet window or multiple inlet windows, for illustrative purposes a multi-window air inlet is shown. The air inlet 50 includes a first inlet window 52, a second inlet window 54 that is disposed adjacent to the first inlet window 52, and a third inlet window 56 that is disposed adjacent to the second inlet window 54. Each inlet window is configured as an elongate window having a length greater than its width. In at least one embodiment, a frame 58 is disposed about the air inlet 50 and encompasses the first inlet window 52, the second inlet window 54, and the third inlet window 56. The frame 58 extends above the exterior surface of the strut body 40.

The first inlet window 52 is separated from the second inlet window 54 by a first partition 60. Each of the first inlet window 52 and the second inlet window 54 have a width that is greater than a width of the first partition 60.

The second inlet window 54 is separated from the third inlet window 56 by a second partition 62. Each of the second inlet window 54 and the third inlet window 56 have a width that is greater than a width of the second partition 62.

The generator 24 is operatively connected to the first end 42 of the strut 22. The generator 24 is pivotally connected to the mounting frame 20 or aircraft structure through the generator 24. The generator 24 defines a generator cooling air inlet and a generator cooling air outlet 70. Ram air or cooling air that is provided through the air inlet 50 defined by the strut body 40 of the strut 22 flows through the hollow body of the strut body 40 towards the generator cooling air inlet, through the generator 24, and out of the generator cooling air outlet 70. As such, air inlet 50 is configured as a cooling air inlet that provides cooling air to electronic components of the generator 24.

The generator 24 is configured to include a permanent magnet generator.

The turbine 26 is disposed at the second end 44 of the strut 22. The turbine 26 includes a gearbox 80, a turbine hub 82, and blades 84. The turbine hub 82 is operatively connected to the gearbox 80. The blades 84 extend from the turbine hub 82. The blades 84 and the turbine hub 82 are arranged to rotate in response to ram air that encounters the blades 84 while the ram air turbine system 10 is in the deployed position. The turbine 26 is drivably connected or operably connected to the generator 24 through a drive shaft that extends between the generator 24 and the gearbox 80. The gearbox 80 is configured to impart the rotary motion of the turbine hub 82 and the blades 84 into rotary motion of the drive shaft to operate the generator 24.

The rotation of the turbine 26 rotates the drive shaft that rotates the generator 24 and provides power to a generator control unit 72 and to the heating system 28. The generator 24 is configured to begin providing electrical power to the heating system 28 as soon as the turbine 26 begins rotating.

Figure 2:
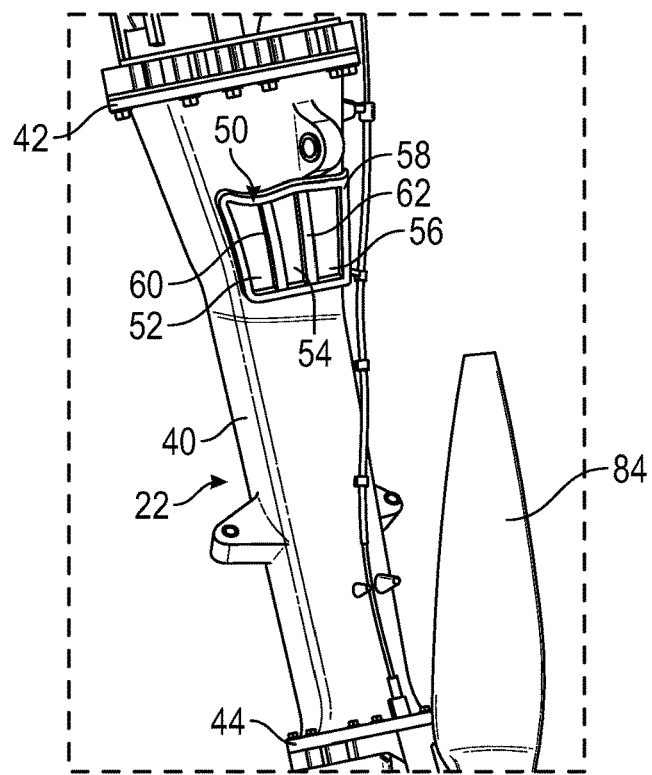
FIG. 2 is a partial perspective view of a strut having an air inlet of the ram air turbine system.
Figure 3:
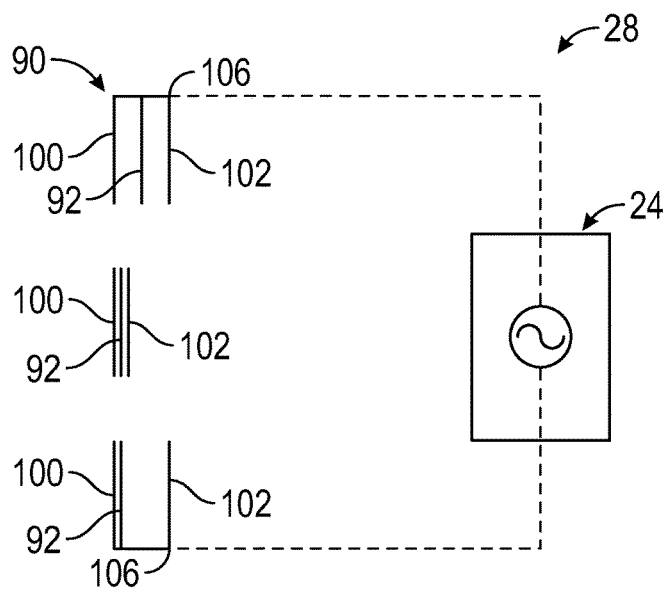
FIG. 3 is a schematic of a heating system provided with the ram air turbine system.

Referring to FIGS. 1-3, the heating system 28 is configured to inhibit the formation of ice on the air inlet 50 defined by the strut body 40 of the strut 22 while the ram air turbine system 10 is deployed and operational. The operation of the generator 24 provides power to the heating system 28 that is independent of or isolated from an aircraft power system or power source. The heating system 28 includes a heated screen 90 having a heating element 92 that is electrically connected to the generator 24.

The heated screen 90 defines a plurality of openings that facilitate or permit airflow through the heated screen 90 and into the air inlet 50. The heated screen 90 having a heating element 92 is disposed across or over the air inlet 50 and is secured to the strut body 40 of the strut 22. In at least one embodiment, the heated screen 90 having a heating element 92 is operatively connected to the frame 58 that extends about the air inlet 50. The heating element 92 electrically connected to the generator 24 and is electrically isolated from an aircraft power source. The heating element 92 is disposed within the heated screen 90.

The heated screen 90 includes a first screen element 100 and a second screen element 102. The first screen element 100 is spaced apart from the second screen element 102 such that the heating element 92 is disposed between the first screen element 100 and the second screen element 102. In at least one embodiment, the heating element 92 is sandwiched between the first screen element 100 and the second screen element 102. In at least one embodiment, the heating element 92 is a film heating element that is applied to at least one of the first screen element 100 and the second screen element 102. In at least one embodiment, the heating element 92 is woven with or integral with at least one of the first screen element 100 and the second screen element 102. In such an embodiment, the heating element 92 includes a plurality of electrically conductive elements or fibers. In at least one embodiment, at least one of the first screen element 100 and the second screen element 102 of the heated screen 90 is impregnated with the heating element 92.

In at least one embodiment, the heating element 92 is a resistive heating element, a surface type heating element, a sheet heating element, a channel wire heating structure, or the like that produces or generates heat in response to the provision of electrical power by the generator 24 to the heating element 92. The heating element 92 extends between electrical connectors or electrodes 106 that are electrically connected to the generator 24 by wiring that is routed internally through the strut body 40 of the strut 22 to the generator 24. The electrodes 106 are positioned within or extend from opposite ends of the heated screen 90. The electrodes 106 are embedded or molded within a portion of at least one of the first screen element 100 and the second screen element 102.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A ram air turbine system, comprising:
    a strut that is pivotally connected to a mounting frame that is operatively connected to an aircraft structure, the strut defining a strut body that extends between a first end and a second end, the strut body defining an air inlet;
    a frame disposed about the aft inlet and extends above an exterior surface of the strut body;
    a heated screen connected to the frame and disposed over the air inlet, the heated screen having a heating element embedded within the heated screen, the heating element being a film applied to the heated screen;
    a turbine that is disposed at the second end of the strut; and
    a generator that is disposed proximate the first end of the strut, the generator being drivably connected to the turbine via a drive shaft.

2. The ram air turbine system of claim 1, wherein the heating element is electrically connected to the generator.

3. The ram air turbine system of claim 1, wherein the heating element is electrically isolated from an aircraft power source.

4. The ram air turbine system of claim 1, the air inlet is configured as a cooling air inlet that provides cooling air to the generator.

5. The ram air turbine system of claim 4, wherein the generator defines a cooling air outlet that exhausts the cooling air that is provided to the generator.

6. A ram aft turbine system, comprising:
    a strut having a first end that is connected to a generator that is drivably connected to a turbine connected to a second end, the strut provided with an air inlet that is disposed proximate the first end;
    a frame disposed about the air in and extends above an exterior surface of the strut;
    a heating system being electrically connected to the generator, the heating system having a heated screen disposed over the air inlet and connected to the frame, the heated screen including a heating element disposed between a first screen and a second screen element that is spaced apart from and disposed opposite the first screen element, the heating element comprising a film applied to at least one of the first screen element and the second screen element.

7. The ram air turbine system of claim 6, wherein the generator defines an air outlet.

8. The ram air turbine system of claim 6, wherein the air inlet includes a first inlet window disposed adjacent to a second inlet window.

9. The ram air turbine system of claim 8, wherein the first inlet window is separated from the second inlet window by a first partition.

10. The ram air turbine system of claim 9, wherein the air inlet further includes a third inlet window disposed adjacent to the second inlet window.

11. The ram air turbine system of claim 10, wherein the second inlet window is separated from the third inlet window by a second partition.

\* \* \* \* \*